US010431968B2

(12) United States Patent
Weaver (10) Patent No.: US 10,431,968 B2
(45) Date of Patent: Oct. 1, 2019

(54) CONDUCTOR POSITIONING FIXTURE FOR CABLE PROCESSING

(71) Applicant: TE CONNECTIVITY CORPORATION, Berwyn, PA (US)

(72) Inventor: Brian Keith Weaver, Harrisburg, PA (US)

(73) Assignee: TE Connectivity Corporation, Berwyn, PA (US)

(*) Notice: Subject to any disclaimer, the term of this patent is extended or adjusted under 35 U.S.C. 154(b) by 66 days.

(21) Appl. No.: 15/785,553

(22) Filed: Oct. 17, 2017

(65) Prior Publication Data

US 2019/0115734 A1 Apr. 18, 2019

(51) Int. Cl.
| | | |
|---|---|---|
| *F16L 3/08* | (2006.01) | |
| *H02G 3/04* | (2006.01) | |
| *F16L 3/02* | (2006.01) | |
| *G02B 6/44* | (2006.01) | |
| *H02G 1/00* | (2006.01) | |
| *B25B 5/00* | (2006.01) | |
| *B25B 5/02* | (2006.01) | |
| *B25B 5/04* | (2006.01) | |
| *B25B 5/12* | (2006.01) | |
| *H01R 43/28* | (2006.01) | |
| *H01R 103/00* | (2006.01) | |

(52) U.S. Cl.
CPC ........... *H02G 3/0456* (2013.01); *B25B 5/003* (2013.01); *B25B 5/006* (2013.01); *B25B 5/02* (2013.01); *B25B 5/04* (2013.01); *B25B 5/12* (2013.01); *F16L 3/02* (2013.01); *G02B 6/4471* (2013.01); *H01R 43/28* (2013.01); *H02G 1/00* (2013.01); *H01R 2103/00* (2013.01)

(58) Field of Classification Search
CPC ........ H02G 3/0456; F16L 3/02; G02B 6/4471
USPC ........................................................ 248/74.1
See application file for complete search history.

(56) References Cited

U.S. PATENT DOCUMENTS

| | | | |
|---|---|---|---|
| 5,133,113 A | 7/1992 | Mueller et al. | |
| 9,977,211 B1 * | 5/2018 | Courchaine | G02B 6/4446 |
| 10,042,137 B2 * | 8/2018 | Conrad | G02B 6/4471 |

FOREIGN PATENT DOCUMENTS

NL    6703881 A    10/1967

OTHER PUBLICATIONS

International Search Report, International Application No. PCT/IB2018/057651, International Filing Date, Oct. 2, 2018.

* cited by examiner

*Primary Examiner* — Todd M Epps (57) ABSTRACT

A conductor positioning fixture includes a base and a retainer member. The base includes a positioning platform and a wedge projecting upward from a top surface of the positioning platform. The base receives a cable on the top surface of the positioning platform such that exposed segments of first and second conductors of the cable extend along opposite sides of the wedge. The retainer member is mounted to the base and movable relative to the base along a longitudinal axis between a retracted position, at which the retainer member is spaced apart from the wedge, and an extended position, at which the retainer member overlaps the wedge. As the retainer member moves from the retracted position towards the extended position, the retainer member engages and forces the exposed segments of the first and second conductors into designated presentation positions.

21 Claims, 7 Drawing Sheets

CONDUCTOR POSITIONING FIXTURE FOR CABLE PROCESSING

BACKGROUND OF THE INVENTION

The subject matter herein relates generally to conductor positioning fixtures that are used for positioning and securing cable conductors in place for processing the cable conductors.

Cable assemblies are used for providing a conductive path between devices for transmitting electrical and/or optical signals along the conductive path. The ends of the cable in a cable assembly may be prepared for electrically and/or optically connecting to the corresponding devices by processing the ends. Electrical and/or optical cables may be processed by stripping a cable jacket, untwisting cable conductors, cutting the ends of the cable conductors, stripping an insulation (or other surrounding) layer from the ends of the cable conductors, crimping a terminal to the ends of the cable conductors, soldering a terminal to the ends of the cable conductors, inserting the ends of the cable conductors into mechanical splices, and/or the like. The cable conductors may be electrical wires and/or optical fibers.

Known methods of preparing low volumes of cables for processing are generally manual. For example, an operator may use a wire stripper to cut and remove an end segment of a cable jacket, exposing the conductors. Then the operator may manually untwist the conductors, before presenting the cable with the exposed conductors to various processing stations for cutting (e.g., zero-cutting), stripping, and terminating (e.g., crimping, soldering, and/or connecting to terminal or splice devices) the conductors. The manual approach has several disadvantages, including low efficiency, accuracy, and repeatability. For example, it may be difficult for an operator to produce a series of cable assemblies that have substantially the same characteristics, such as having substantially the same cable breakout length extending from the edge of the cable jacket to the ends of the conductors. Some of the cable assemblies with different characteristics may have to be disposed for not meeting strict product specifications. It also may be difficult and time-consuming for the operator to manually align each of the conductors with an input opening in a designated processing machine. Since the conductors within the jacket may be twisted, it may be difficult and time-consuming to manually un-twist and orient the conductors towards a given input opening, especially for processing machines that have multiple openings for receiving more than one of the conductors at the same time.

A need remains for a conductor positioning fixture that assists an operator with positioning cable conductors in designated positions and securing the cable conductors in the designated positions for more efficient, accurate, and repeatably cable processing.

BRIEF DESCRIPTION OF THE INVENTION

In an embodiment, a conductor positioning fixture is provided that includes a base and a retainer member. The base includes a positioning platform and a wedge projecting upward from a top surface of the positioning platform. The base is configured to receive a cable on the top surface of the positioning platform such that exposed segments of a first conductor and a second conductor of the cable extend along opposite sides of the wedge. The retainer member is mounted to the base and movable relative to the base along a longitudinal axis between a retracted position and an extended position. The retainer member is spaced apart from the wedge along the longitudinal axis when in the retracted position and at least partially overlaps the wedge along the longitudinal axis when in the extended position. As the retainer member moves from the retracted position towards the extended position, the retainer member is configured to engage and force the exposed segments of the first and second conductors of the cable into designated presentation positions.

In an embodiment, a conductor positioning fixture is provided that includes a base and a retainer member. The base includes a positioning platform and a wedge projecting upward from a top surface of the positioning platform. The base is configured to receive a cable on the top surface of the positioning platform such that exposed segments of a first conductor and a second conductor of the cable extend along opposite sides of the wedge. The retainer member is mounted to the base and movable relative to the base between a retracted position and an extended position. The retainer member includes two arms spaced apart from each other and defining a channel therebetween. The two arms are disposed above the top surface of the positioning platform such that a bottom side of each of the arms faces the top surface. As the retainer member moves from the retracted position towards the extended position, the wedge is received within the channel between the arms and the arms engage the exposed segments of the first and second conductors to force the exposed segments into designated presentation positions.

In an embodiment, a conductor positioning fixture is provided that includes a base and a retainer member. The base includes a securing platform, a positioning platform, and a track section located between the securing platform and the positioning platform. The base is configured to receive a cable on the securing platform and the positioning platform such that exposed segments of a first conductor and a second conductor of the cable are disposed on the positioning platform. The securing platform has a cable clamp mounted thereto that is configured to engage a portion of the cable on the securing platform to fix the cable to the securing platform. The retainer member is mounted to the track and movable relative to the base between a retracted position and an extended position. The retainer member is configured to engage and force the exposed segments of the first and second conductors of the cable into designated presentation positions relative to the positioning platform as the retainer member moves from the retracted position towards the extended position.

DETAILED DESCRIPTION OF THE INVENTION

Figure 1:
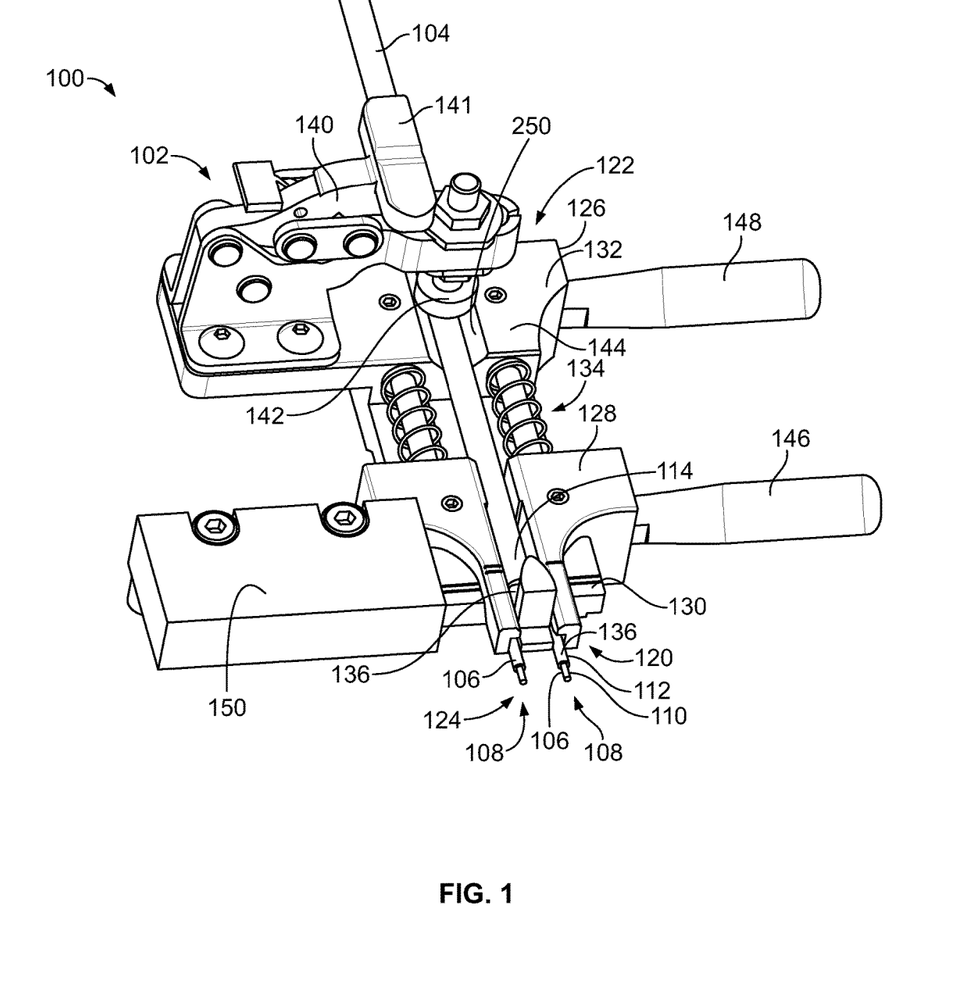
FIG. 1 is a front perspective view of a cable processing system formed in accordance with an embodiment.

FIG. 1 is a front perspective view of a cable processing system 100 formed in accordance with an embodiment. The cable processing system 100 includes a conductor positioning fixture 102 and a cable 104 secured on the conductor positioning fixture 102. The cable 104 includes multiple conductors 106. The conductor positioning fixture 102 is a device for aligning the conductors 106 in one or more specific positions, referred to herein as presentation positions 108, to assist with processing the conductors 106. The conductor positioning fixture 102 is also configured to secure or clamp the conductors 106 in the designated presentation positions 108 to prevent the conductors 106 from undesirably moving away from the presentation positions 108, such as before the conductors 106 are cut, stripped, terminated, or otherwise processed. The conductor positioning fixture 102 has a size and dimension that allows a human operator to manually operate the conductor positioning fixture 102. The operator is also able to carry the conductor positioning fixture 102, with the cable 104 secured therein, to one or more processing stations to perform various processing tasks on the conductors 106 without removing the cable 104 from the conductor positioning fixture 102. For example, the operator may secure the cable 104 in the conductor positioning fixture 102, then carry conductor positioning fixture 102 to a cutting station at which the conductors 106 are zero-cut to specified lengths. Then, the operator may remove the conductor positioning fixture 102 from the cutting station and take the conductor positioning fixture 102 and cable 104 therein to a stripping station at which an insulation layer is stripped from the conductors 106. Although the various processing tasks may occur at different locations, the cable 104 may remain fixed in place relative to the conductor positioning fixture 102 throughout.

The cable 104 may be a twisted pair electrical cable including two conductors 106 commonly surrounded by a cable jacket 114. The two conductors 106 in the illustrated embodiment are insulated wires having a metal core 110 and an insulation layer 112 that surrounds the metal core 110. The cable 104 may be a high speed cable 104 that transmits data signals at speeds over 10 gigabits per second (Gbps), such as over 25 Gbps. Optionally, the cable 104 may be configured to transmit low speed data signals and/or power. In an alternative embodiment, the cable 104 may be an optical cable that includes one or more optical fibers as conductors instead of insulated wires. Optionally, the cable 104 may include at least one insulated wire and at least one optical fiber within the jacket 114. Although not shown, the cable 104 may include additional elements, such as a conductive shield layer (e.g., a metal braid and/or a metal foil) surrounding the insulated wires 106.

The conductor positioning fixture 102 has a presentation end 120 and an opposite, cable end 122. The cable 104 is clamped or fixed in place on the conductor positioning fixture 102 in the illustrated embodiment. The conductors 106 at an end 124 of the cable 104 are aligned in the designated presentation positions 108. In the presentation positions 108, the conductors 106 are cantilevered relative to the fixture 102 and project beyond the presentation end 120. The cantilevered portions of the conductors 106 at the end 124 can be received in a device or tool for processing. The cable 104 extends the length of the conductor positioning fixture 102 such that the cable 104 also protrudes beyond the cable end 122 to an opposite end (not shown) of the cable 104.

The conductor positioning fixture 102 includes a base 126 and a retainer member 128 that is mounted to the base 126 and movable relative to the base 126 between a retracted position and an extended position. The retainer member 128 is in the extended position in the illustrated embodiment. The retainer member 128 engages the conductors 106 of the cable 104 and secures the conductors 106 in the presentation positions 108 when in the extended position. When in the retracted position, the retainer member 128 does not engage the conductors 106, so the cable 104 is allowed to be removed from the fixture 102.

The base 126 includes a positioning platform 130, a securing platform 132, and a track 134 therebetween. The track 134 connects the positioning platform 130 to the securing platform 132. The base 126 may be formed of a metal or plastic material. The retainer member 128 is mounted on the track 134 and moves along the track 134 between the extended and retracted positions. Exposed segments 136 of the conductors 106, which protrude beyond the cable jacket 114, are loaded on the positioning platform 130. The cable 104 (including the cable jacket 114) extends across the track 134 and the securing platform 132. The base 126 may be configured for removably coupling to one or more processing stations for processing the conductors 106 of the cable 104 while held by the fixture 102.

Figure 4:
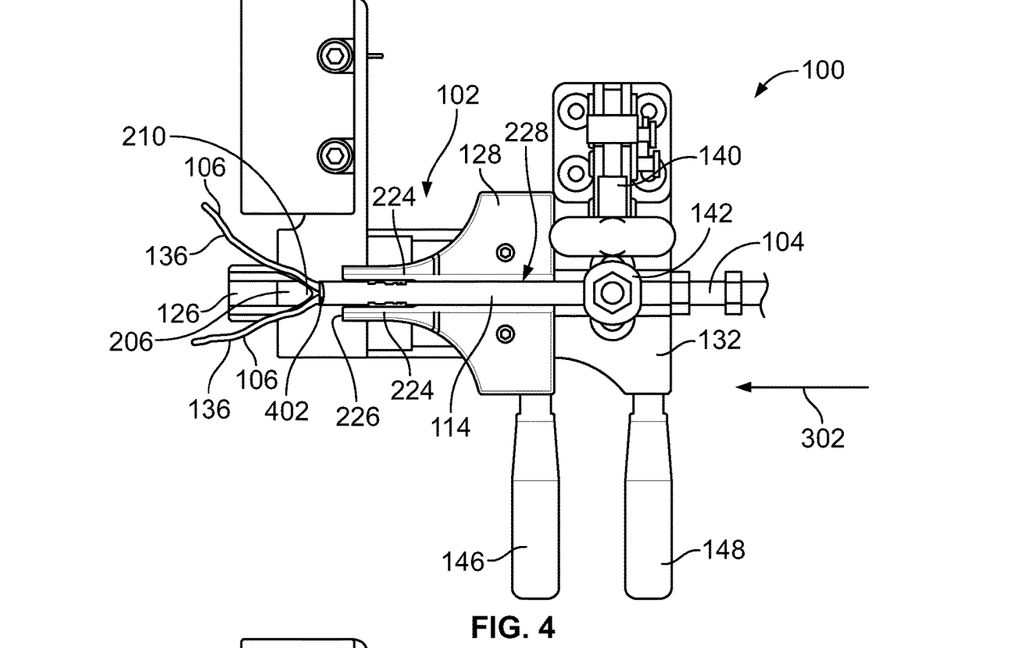
FIG. 4 is a top-down view of the cable processing system according to an embodiment showing the retainer member in the retracted position.

The conductor positioning fixture 102 includes a cable clamp 140 that is mounted to the securing platform 132. The cable clamp 140 includes a pivotable lever 141 and a head 142. When the lever 141, is pivoted to a closed position, the head 142 is configured to engage the cable 104 to secure the cable 104 to the fixture 102. For example, the head 142 engages the cable 104 from above, sandwiching the cable 104 between the head 142 and a top surface 144 of the securing platform 132. When the cable 104 is clamped by the cable clamp 140, the cable 104 is fixed in position relative to the fixture 102, although the conductors 106 are not in the presentation positions 108 if the retainer member 128 is in the retracted position (as shown in FIG. 4). The securing platform 132 in the illustrated embodiment defines a trench 250 along the top surface 144. The trench 250 extends parallel to a longitudinal axis 193 (shown in FIG. 2) and is configured to receive the cable 104 therein. The trench 250 is used for aligning the cable 104 with the head 142 of the cable clamp 140 for reliably clamping the cable 104 to the securing platform 132.

In an embodiment, the conductor positioning fixture 102 includes a first handle 146 that is mounted to the retainer member 128, and a second handle 148 mounted to the base 126. The handles 146, 148 are configured to be grasped by an operator to allow for manual movement of the retainer member 128 between the retracted and extended positions. The first and second handles 146, 148 optionally extend parallel to each other. Also, the first and second handles 146, 148 are optionally identical or at least similar in size and dimensions. The second handle 148 is mounted to the securing platform 132 in the illustrated embodiment, but may be mounted to another portion of the base 126, such as the positioning platform 130 in an alternative embodiment. In another alternative embodiment, the conductor positioning fixture 102 includes the first handle 146 mounted to the retainer member 128, but does not include the second handle 148. For example, the conductor positioning fixture 102 may be removably mounted or nested to a processing station, which holds the base 126 in place. Therefore, the operator does not need to hold the base 126 (or a handle thereof) in order to manually maneuver the retainer member 128 using the handle 146.

The conductor positioning fixture 102 optionally includes a safety sensor actuator 150 that is mounted to the positioning platform 130. As described above, the conductor positioning fixture 102 may be configured to be mounted to various processing stations to perform various processing tasks on the conductors 106. One or more of the processing stations may include safety sensors that prohibit operation of the machinery in the processing stations unless receiving a signal indicating that the conductor positioning fixture 102 is properly mounted in the processing station. The safety sensor actuator 150 is configured to provide the signal indicating that the conductor positioning fixture 102 is properly mounted, triggering the safety sensor to enable operation of the machinery. For example, the safety sensor actuator 150 may provide the signal by communicating (e.g., transmitting or broadcasting) a signal to the safety sensor of the processing station, by obstructing or reflecting the transmission of a signal communicated by the safety sensor, or the like.

Figure 2:
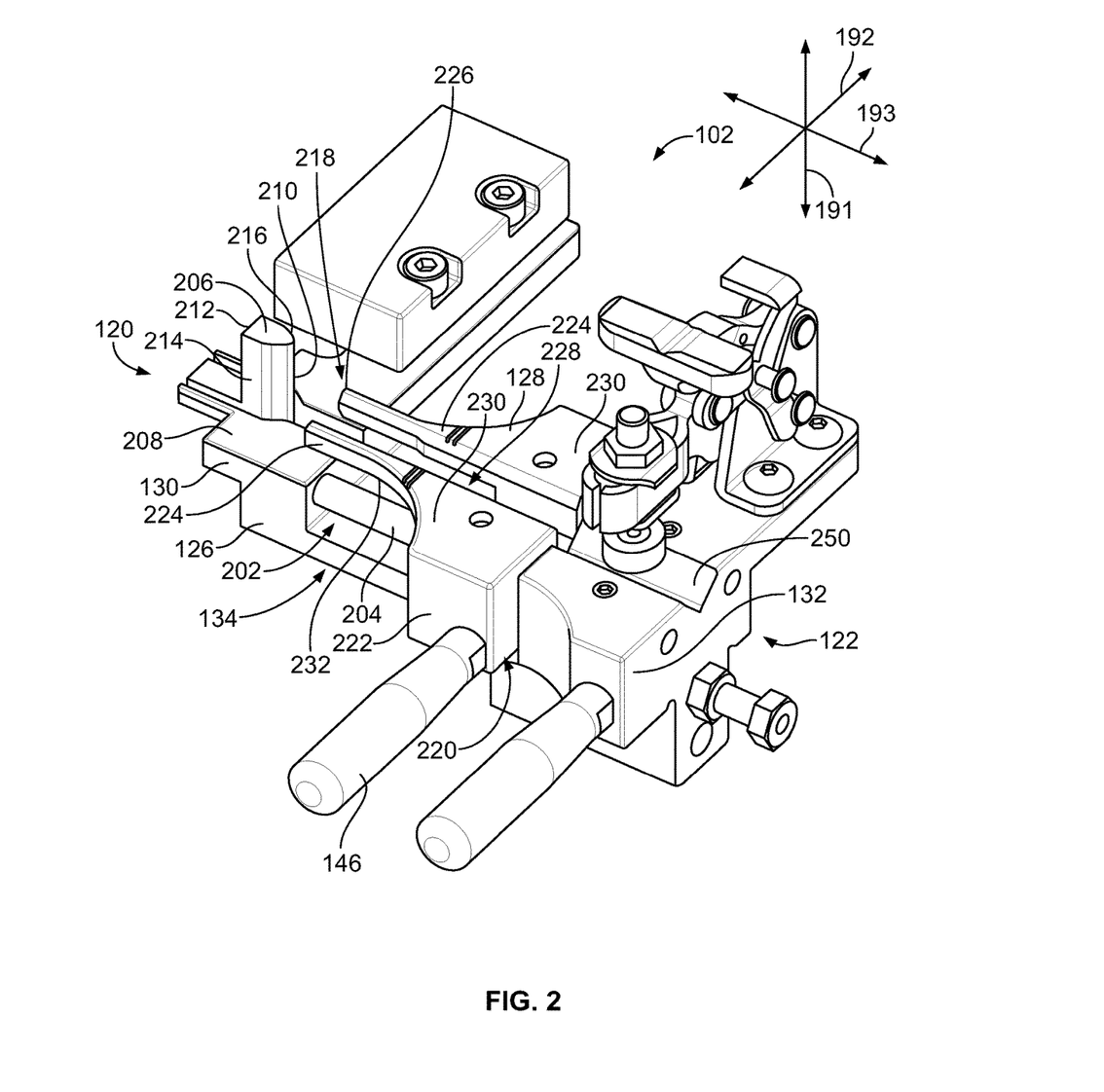
FIG. 2 is a perspective view of a conductor positioning fixture of the cable processing system according to an embodiment showing a retainer member of the conductor positioning fixture in a retracted position relative to a base of the conductor positioning fixture.

FIG. 2 is a perspective view of the conductor positioning fixture 102 according to an embodiment showing the retainer member 128 in the retracted position relative to the base 126. The cable 104 (shown in FIG. 1) is omitted from the conductor positioning fixture 102 in FIG. 2. The conductor positioning fixture 102 is oriented with respect to a vertical or elevation axis 191, a lateral axis 192, and a longitudinal axis 193. The axes 191-193 are mutually perpendicular. Although the elevation axis 191 appears to extend in a vertical direction generally parallel to gravity, it is understood that the axes 191-193 are not required to have any particular orientation with respect to gravity or the surrounding environment.

In the illustrated embodiment, the base 126 along the track 134 defines a cavity 202, and the track 134 includes a pair of rails 204 that extend across the cavity 202. Only one of the rails 204 is clearly shown in the illustrated embodiment. Each rail 204 is connected to the positioning platform 130 and the securing platform 132, and is suspended across the cavity 202. The rails 204 extend parallel to each other. In an embodiment, the rails 204 extend parallel to the longitudinal axis 193. The retainer member 128 is mounted to the rails 204 and moves along the length of the rails 204. In an embodiment, the retainer member 128 is configured to move linearly along the longitudinal axis 193 between the retracted and extended positions. The rails 204 are cylindrical rods in the illustrated embodiment, but may have other shapes in other embodiments.

The conductor positioning fixture 102 includes a wedge 206 that projects upward from a top surface 208 of the positioning platform 130. As used herein, relative or spatial terms such as "front," "rear," "top," "bottom," "upper," and "lower" are only used to distinguish the referenced elements of the conductor positioning fixture 102 and do not necessarily require particular positions or orientations relative to gravity and/or relative to the surrounding environment of the conductor positioning fixture 102. The wedge 206 may be formed integral to the positioning platform 130 or may be formed separately and subsequently mounted to the platform 130. The wedge 206 includes a tapered end 210, an opposite, broad end 212, and two sides 214, 216 that extend from the tapered end 210 to the broad end 212. The wedge 206 is oriented such that the tapered end 210 is the part of the wedge 206 located most proximate to the cable end 122 of the fixture 102, and the broad end 212 is the part of the wedge 206 located most proximate to the presentation end 120 of the fixture 102.

The retainer member 128 has a front end 218 and an opposite, rear end 220. The retainer member 128 is oriented along the longitudinal axis 193 such that the front end 218 is most proximate to the presentation end 120 and the rear end 220 is most proximate to the cable end 122. The retainer member 128 includes a mounting portion 222 that engages the rails 204 of the track 134. The retainer member 128 also includes two arms 224 that extend from the mounting portion 222. Distal ends 226 of the arms 224 define the front end 218, and the mounting portion 222 defines the rear end 220. The handle 146 is coupled to the mounting portion 222 in the illustrated embodiment. In an embodiment, the retainer member 128 defines a channel 228 that extends parallel to the longitudinal axis 193. The channel 228 is open along a top side 230 of the retainer member 128. A first length of the channel 228 is defined between the two arms 224. In an embodiment, the first length of the channel 228 defined between the two arms 224 extends through an entire height or vertical thickness of the arms 224, such that the channel 228 is open along both the top side 230 and an opposite bottom side 232 of the arms 224 along the first length.

The channel 228 optionally extends the full length of the retainer member 128 between the front end 218 and the rear end 220. As such, a second length of the channel 228 (that is coaxial to the first length) is defined along the mounting portion 222. The second length of the channel 228 is open along the top side 230, but does not extend fully through the thickness of the mounting portion 222. For example, a bridge section 256 (shown in FIG. 3) of the mounting portion 222 defines a bottom of the channel 228. The bridge section 256 structurally connects the portions of the retainer member 128 on opposite sides of the channel 228. The cable 104 (shown in FIG. 1) may be received within the channel 228 by lowering the cable 104 into the channel 228 from above.

The retainer member 128 is disposed in the retracted position in FIG. 2. In the retracted position, the retainer member 128 is spaced apart axially from the wedge 206 (along the longitudinal axis 193). For example, the front end 218 of the retainer member 128 is spaced apart from the tapered end 210 of the wedge 206. Therefore, the wedge 206 is not received in the channel 228 between the arms 224 of the retainer member 128, and the arms 224 do not overlap the wedge 206. As described below with reference to FIG. 4, the cable 104 can be loaded into the fixture 102 when the retainer member 128 is in the retracted position because there is space to align the cable 104 with the wedge 206.

Figure 3:
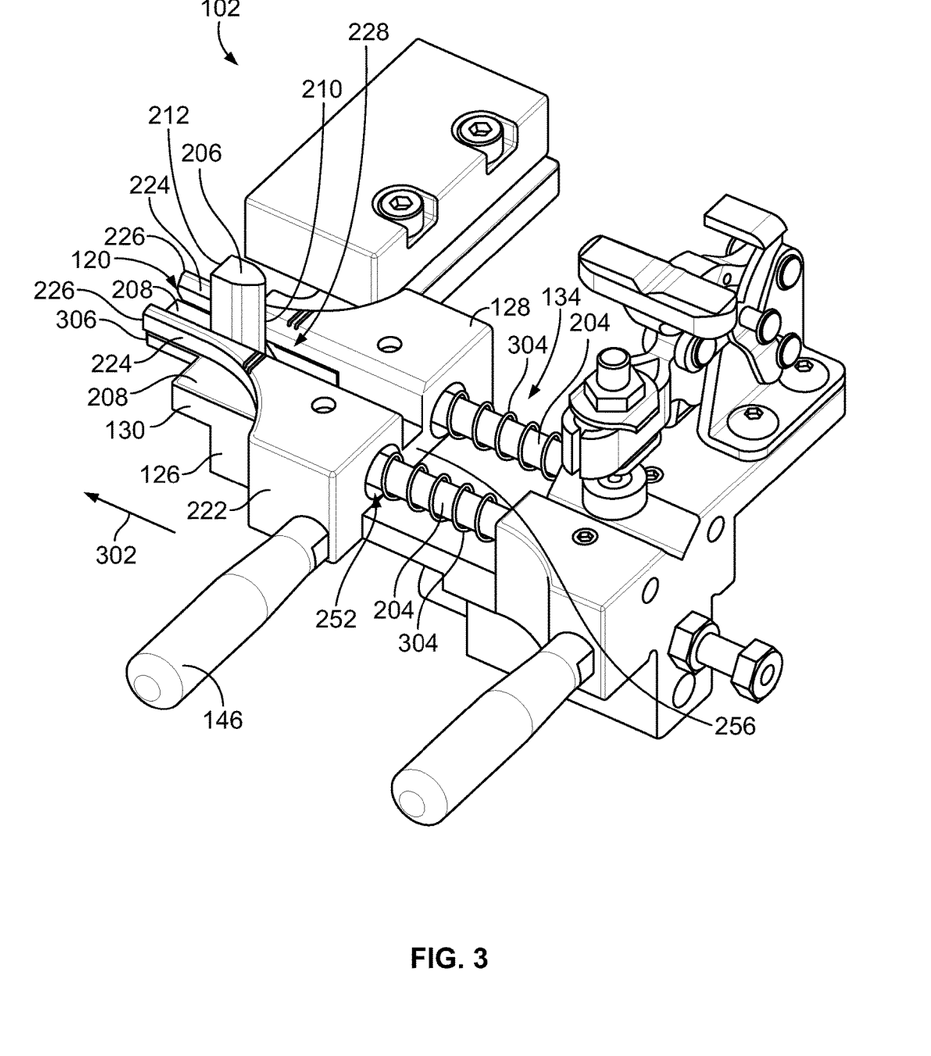
FIG. 3 is a perspective view of the conductor positioning fixture according to an embodiment showing the retainer member in an extended position relative to the base.

FIG. 3 is a perspective view of the conductor positioning fixture 102 according to an embodiment showing the retainer member 128 in the extended position relative to the base 126. From the retracted position shown in FIG. 2, the retainer member 128 moves towards the wedge 206 and at least partially overlaps the wedge 206. For example, in an embodiment, the retainer member 128 moves linearly in a frontward direction 302 along the longitudinal axis 193 (shown in FIG. 2) from the retracted position to the extended position. Alternatively, the movement of the retainer member 128 may be at least slightly curved instead of linear. The retainer member 128 is configured to move back-and-forth along the track 134 between the retracted position and the extended position. In an embodiment, the mounting portion 222 of the retainer member 128 defines openings 252 that receive the rails 204 therethrough for mounting the retainer member 128 to the track 134. Engagement between the rails 204 and interior surfaces within the openings 252 guides the movement of the retainer member 128.

In an embodiment, the retainer member 128 moves automatically towards the extended position because the retainer member 128 is biased towards the extended position. The retainer member 128 is biased via coil springs 304 disposed between the mounting portion 222 of the retainer member 128 and the securing platform 132. In the illustrated embodiment, a coil spring 304 is disposed on each of the two rails 204 on the track 134. Manually moving the retainer member 128 to the retracted position via grasping the handle 146 increases the amount of resistance provided by the coil springs 304, such that, when the manual force on the handle 146 is removed, the springs 304 force the retainer member 128 to move in the frontward direction 302 towards the extended position. In an embodiment, the retainer member 128 reaches the extended position when the mounting portion 222 abuts against the positioning platform 130 or another hard stop surface.

Although coil springs 304 are shown, different biasing members may be used for biasing the retainer member 128, such as leaf springs, torsion springs, elastic bands, or the like. In an alternative embodiment, the retainer member 128 is not biased towards either of the two positions, and an operator can manually move the retainer member 128 towards the extended position and the retracted position using the handle 146. In another alternative embodiment, the retainer member 128 is biased towards the retracted position. Once a cable (e.g., the cable 104 shown in FIG. 1) is loaded onto the fixture 102, the retainer member 128 can be manually moved (against the resistance provided by the biasing member) to the extended position and then locked into the extended position using a latch or another securing mechanism.

As the retainer member 128 moves from the retracted position towards the extended position, the arms 224 of the retainer member 128 move along the top surface 208 of the positioning platform 130. For example, the arms 224 may slide along the top surface 208 or may be disposed vertically above the top surface 208 without engaging the top surface 208. The position and direction of movement of the retainer member 128 relative to the positioning platform 130 is controlled by the track 134. The retainer member 128 moves in the frontward direction 302 such that the arms 224 at least partially overlap the wedge 206. The phrase "at least partially overlaps" as used herein means that the distal ends 226 of the arms 224 extend axially beyond the tapered end 210 of the wedge 206. In the illustrated embodiment, the arms 224 fully or entirely overlap the wedge 206 because the distal ends 226 of the arms 224 extend axially beyond the broad end 212 of the wedge 206. The distal ends 226 of the arms 224 may be disposed at or proximate to a front end 306 of the positioning platform 130 at the presentation end 120 of the fixture 102. Since the arms 224 at least partially overlap the wedge 206, the wedge 206 is received into the channel 228 of the retainer member 128 between the arms 224.

Figure 5:
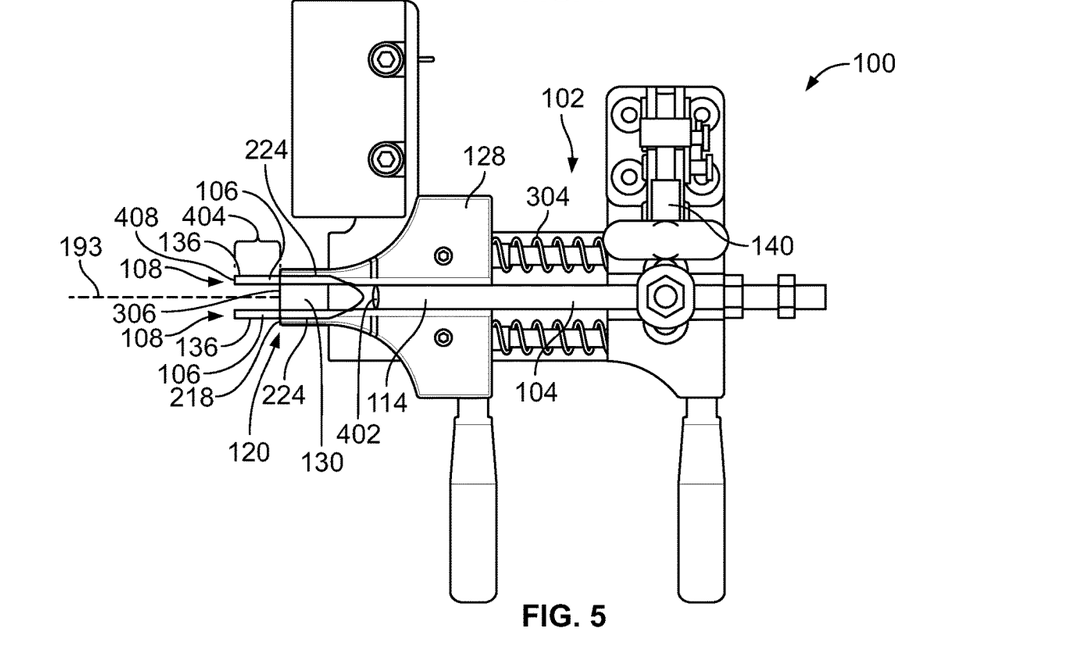
FIG. 5 is a top-down view of the cable processing system according to an embodiment showing the retainer member in the extended position.

FIG. 4 is a top-down view of the cable processing system 100 according to an embodiment showing the retainer member 128 in the retracted position. FIG. 5 is a top-down view of the cable processing system 100 according to an embodiment showing the retainer member 128 in the extended position. FIGS. 4 and 5 illustrate different steps in a method or process of securing cable conductors from a cable into designated positions to support processing the conductors. In FIG. 4, the cable 104 is clamped to the conductor positioning fixture 102. Prior to clamping the cable 104 to the conductor positioning fixture 102, the jacket 114 of the cable 104 may be stripped at an end to expose the exposed segments 136 of the conductors 106 that protrude beyond an end 402 of the jacket 114. The cable 104 in the illustrated embodiment is a twisted-pair cable having two twisted conductors 106. An operator may untwist the exposed segments 136 of the two conductors 106 and then load the cable 104 onto the fixture 102. In an embodiment, prior to loading the cable 104, the operator moves the retainer member 128 to the retracted position shown in FIG. 4, overcoming the resistance of the biasing springs 304. The retainer member 128 may be lockable in the retracted position using a latching mechanism (not shown) or the operator may maintain a grasp on the handle 146 to retain the retainer member 128 in the retracted position. For example, the operator may be able to grasp both handles 146, 148 in one hand to retain the retainer member 128 in the retracted position.

The cable 104 may be loaded by lowering the cable 104 into the channel 228 of the retainer member 128 from above or inserting the cable 104 axially into the channel 228 by moving the cable 104 in the frontward direction 302. The cable 104 extends through the channel 228 such that the end 402 of the jacket 114 and the exposed segments 136 of the conductors 106 are located outside of the channel 228 beyond the distal ends 226 of the arms 224. The operator aligns the two exposed segments 136 to extend along opposite sides of the wedge 206. In FIG. 4, the retainer member 128 does not engage the exposed segments 136, so the exposed segments 136 extend in uncontrolled directions (and are not disposed in the designated presentation positions 108 shown in FIG. 5). The operator may push the cable 104 into engagement with the tapered end 210 of the wedge 206, forcing the conductors 106 to split around the wedge 206. Then, the operator may release the retainer member 128 to allow the retainer member 128 to move to the extended position relative to the base 126 as shown in FIG. 5.

The operator also actuates the cable clamp 140 on the securing platform 132 to secure the axial position of the cable 104 relative to the fixture 102. The cable clamp 140 engages the portion of the cable 104 that extends across the securing platform 132, such that the head 142 engages the cable jacket 114. Optionally, the operator may actuate the cable clamp 140 to engage and secure the cable 104 before or after releasing the retainer member 128. For example, the cable 104 may be clamped to the fixture 102 while the retainer member 128 is in the retracted position or while the retainer member 128 is in the extended position.

Referring to FIG. 5, as the retainer member 128 moves towards the extended position, the arms 224 of the retainer member 128 engage the exposed segments 136 of the conductors 106 and force the exposed segments 136 into the designated presentation positions 108. In the illustrated embodiment, the conductors 106 in the presentation positions include cantilevered lengths 404 that project beyond the presentation end 120 of the fixture 102 (e.g., beyond the front end 218 of the retainer member 128 and beyond the front end 306 of the positioning platform 130). The cantilevered lengths 404 are supported by the segments of the conductors 106 engaged by the positioning platform 130 and the retainer member 128. The cantilevered lengths 404 of the two conductors 106 in the illustrated embodiment are parallel to each other and parallel to the longitudinal axis 193. The parallel positioning of the cantilevered lengths 404 may allow both conductors 106 to be processed at the same time by some processing devices, instead of having to align the conductors 106 one-at-a-time with the processing devices. Alternatively, the fixture 102 may be configured to position the exposed segments 136 of the conductors 106 in designated presentation positions that are not parallel to each other and/or parallel to the longitudinal axis 193.

As shown in FIG. 5, the retainer member 128 in the extended position engages the exposed segments 136 of the conductors 106 and holds the exposed segments 136 in place relative to the fixture 102. Therefore, the cable clamp 140 holds the cable 104 on the fixture 102, and the arms 224 of the retainer member 128 hold the exposed segments 136 of the conductors 106 in fixed positions relative to each other and relative to the fixture 102.

After the conductors 106 are secured in the presentation positions 108, as shown in FIG. 5, the conductor positioning fixture 102 and the cable 104 may be moved to one or more processing stations for processing the conductors 106. One processing station may perform a zero-cut on distal ends 408 of the conductors 106 to achieve a desired breakout length (e.g., from the end 402 of the jacket 114 to the distal ends 408). Another processing station may strip the insulation from the wire conductors 106, and a third processing station may crimp the conductors 106 to corresponding electrical terminals (not shown). After processing the conductors 106, the cable 104 may be removed from the fixture 102. The fixture 102 is then able to receive another cable for repeating the conductor positioning and processing method or sequence.

Figure 6:
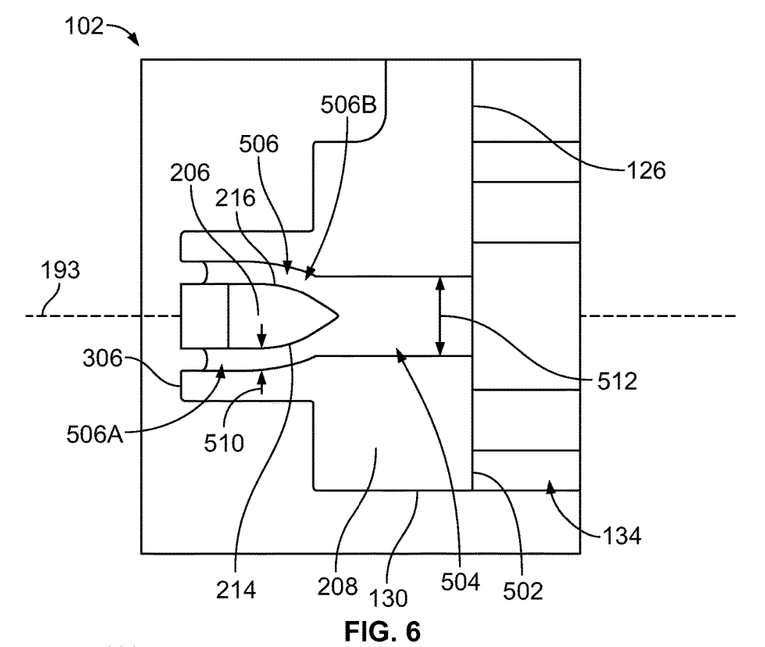
FIG. 6 is a top-down view of a portion of the conductor positioning fixture showing a positioning platform of the base according to an embodiment.

FIG. 6 is a top-down view of a portion of the conductor positioning fixture 102 showing the positioning platform 130 of the base 126 according to an embodiment. In an embodiment, the positioning platform 130 defines grooves along the top surface 208 that are configured to receive the cable 104 therein for positioning the cable 104 relative to the base 126. For example, the grooves include a main groove 504 that extends from the wedge 206 to a rear end 502 of the positioning platform 130. The main groove 504 is generally linear and parallel to the longitudinal axis 193. The main groove 504 receives the jacketed segment of the cable 104 therein. The grooves also include two nesting grooves 506 that extend along opposite sides of the wedge 206. For example, a first nesting groove 506A extends along and is partially defined by the side 214 of the wedge 206, and a second nesting groove 506B extends along and is partially defined by the side 216 of the wedge 206. In the illustrated embodiment, the nesting grooves 506 extend from the main groove 504 and split apart from each other at the wedge 206. The nesting grooves 506 each extend from the main groove 504 to the front end 306 of the positioning platform 130. Optionally, segments of the two nesting grooves 506 at or proximate to the front end 306 are parallel to each other and parallel to the longitudinal axis 193.

The nesting grooves 506 are sized and shaped to each receive one of the exposed segments 136 of the conductors 106 (shown in FIG. 4) therein. For example, the nesting grooves 506 have smaller lateral widths 510 than the lateral width 512 of the main groove 504. The nesting grooves 506 are sized to accommodate one of the conductors 106 without a substantial amount of clearance area around the conductors 106 in order to control the positioning of the conductors 106. For example, when the conductors 106 are received in the nesting grooves 506, the trajectories of the conductors 106 conform to the orientations of the nesting grooves 506. In an alternative embodiment, the positioning platform 130 includes the nesting grooves 506 but does not include the main groove 504.

Figure 7:
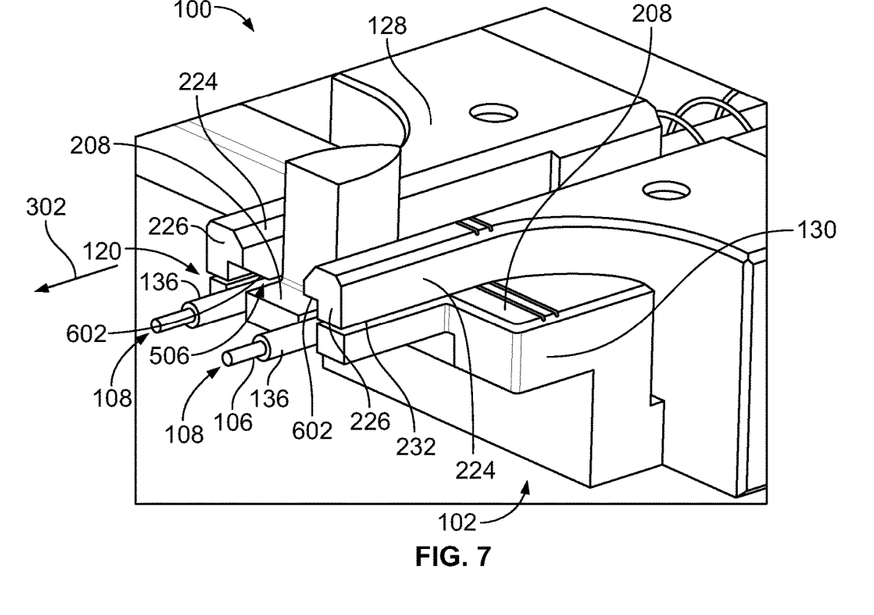
FIG. 7 is a front perspective view of a portion of the cable processing system according to an embodiment showing a presentation end of the conductor positioning fixture.

FIG. 7 is a front perspective view of a portion of the cable processing system 100 according to an embodiment showing the presentation end 120 of the conductor positioning fixture 102. The retainer member 128 is located in the extended position. Prior to the retainer member 128 moving to the extended position, the exposed segments 136 of the conductors 106 may be located on or above the top surface 208 of the positioning platform 130 but not within the nesting grooves 506. For example, the exposed segments 136 may extend freely and unconstrained as shown in FIG. 4. As the retainer member 128 moves to the extended position, the arms 224 engage the exposed segments 136 and force the exposed segments 136 into the corresponding nesting grooves 506 (which are shown in more detail in FIG. 6). For example, the exposed segments 136 may be engaged by the bottom sides 232 of the arms 224 and/or the distal ends 226 of the arms 224 as the arms 224 move in the frontward direction 302. The movement of the arms 224 forces the exposed segments 136 from on or above the top surface 208 into the nesting grooves 506. Once in the nesting grooves 506, the exposed segments 136 of the conductors 106 conform to the orientations of the grooves 506 and assume the designated presentation positions 108.

In an embodiment, the arms 224 of the retainer member 128 each define a respective tapered ramp surface 602 along the bottom side 232 at the distal end 226. The tapered ramp surface 602 is configured to engage the exposed segment 136 of the corresponding conductor 106 and gradually guide the exposed segment 136 into the nesting groove 506 without stubbing.

Figure 8:
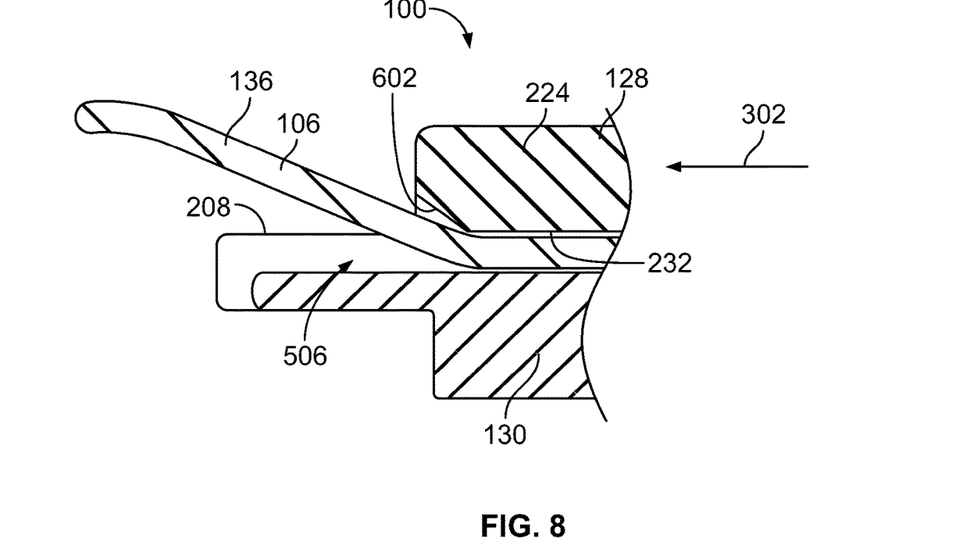
FIG. 8 is a cross-sectional view of a portion of the cable processing system according to an embodiment.

FIG. 8 is a cross-sectional view of a portion of the cable processing system 100 according to an embodiment. In the illustrated embodiment, the positioning platform 130 includes a nesting groove 506 into which the exposed segment 136 of the illustrated conductor 106 is forced by the illustrated arm 224 of the retainer member 128 as the retainer member 128 moves in the frontward direction 302 towards the extended position. For example, the bottom side 232 of the arm 224 moves along the top surface 208 of the positioning platform 130. The tapered ramp surface 602 engages the conductor 106 and guides the conductor 106 into the nesting groove 506. Although a portion of the exposed segment 136 of the conductor 106 in front of the arm 224 is not located within the nesting groove 506, this portion will be forced into the nesting groove 506 when the arm 224 moves above this portion. The exposed segment 136 is retained in the nesting groove 506 by the bottom side 232 of the arm 224 that extends above the exposed segment 136.

Figure 9:
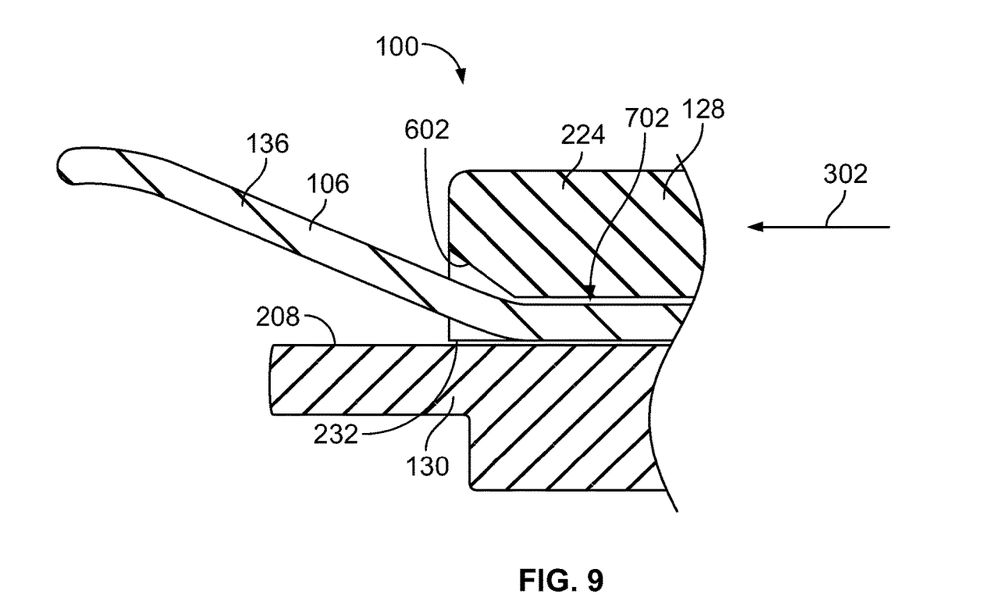
FIG. 9 is a cross-sectional view of a portion of the cable processing system according to an alternative embodiment.

FIG. 9 is a cross-sectional view of a portion of the cable processing system 100 according to an alternative embodiment. The cable processing system 100 in the illustrated embodiment is similar to the embodiment shown in FIG. 8, except that the arm 224 of the retainer member 128 defines a nesting groove 702 that receives the exposed segment 136 of the conductor 106 therein. The positioning platform 130 does not define a nesting groove in the illustrated embodiment. The nesting groove 702 extends upward into the arm 224 from the bottom side 232 of the arm 224. In the illustrated embodiment, the bottom side 232 of the arm 224 moves along the top surface 208 of the positioning platform 130 and the tapered ramp surface 602 of the arm 224 engages the exposed segment 136 of the conductor 106, as described above with respect to FIG. 8. However, the tapered ramp surface 602 guides the conductor 106 into the nesting groove 702 that is defined by the arm 224 itself. The nesting groove 702 in the arm 224 may resemble the size and shape of the nesting grooves 506 in the positioning platform 130 shown in FIG. 6. The exposed segment 136 of the conductor 106 is retained within the nesting groove 702 by being sandwiched between the arm 224 above and the positioning platform 130 below, similar to the embodiment shown in FIG. 8. Although only one arm 224 of the retainer member 128 is shown in FIG. 9, it is understood that the other arm 224 may also define a nesting groove similar to the nesting groove 702 for receiving the other conductor 106 therein as the retainer member 128 moves to the extended position. In another alternative embodiment, both the arms 224 and the positioning platform 130 may define respective nesting grooves that mirror each other.

Figure 10:
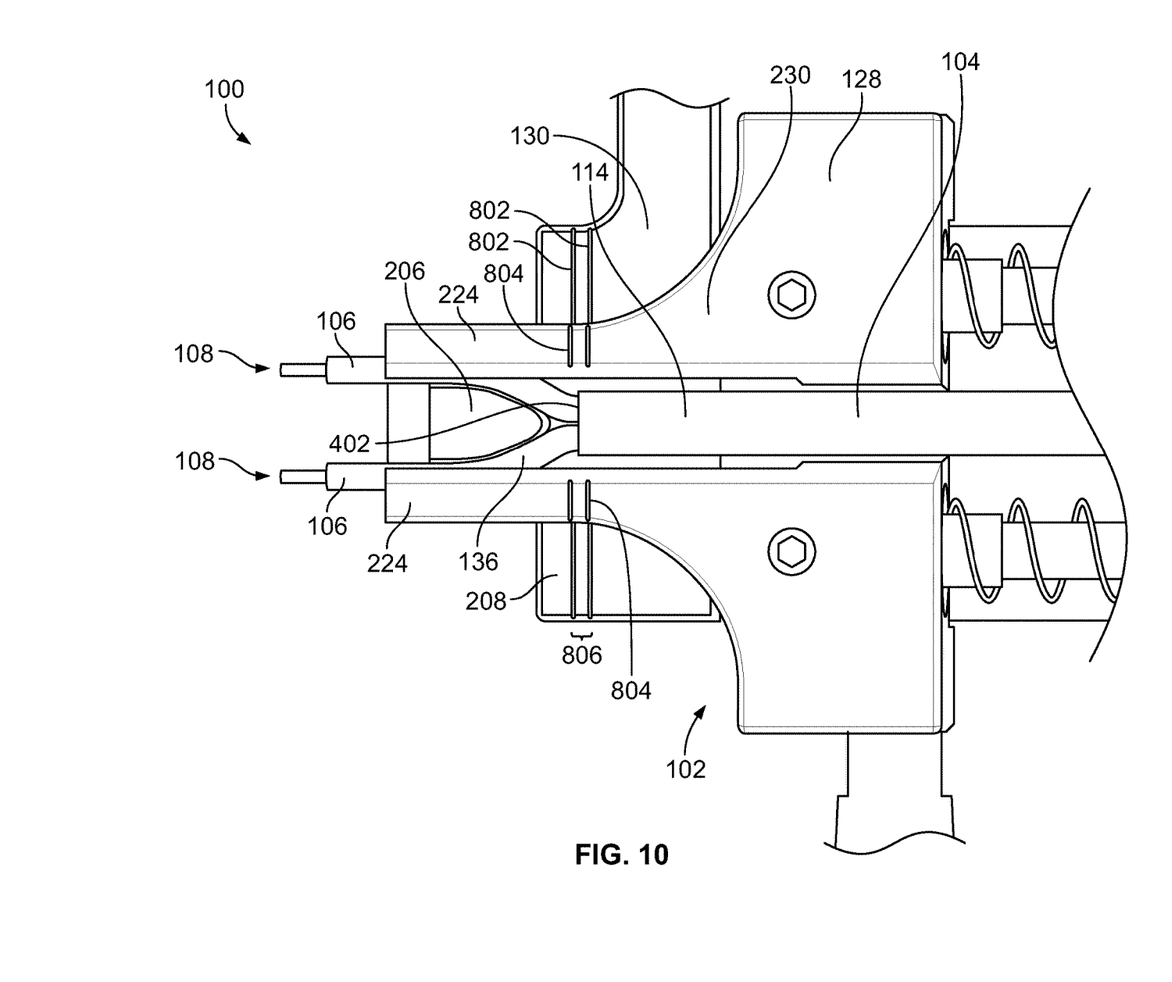
FIG. 10 is a top-down view of a portion of the cable processing system according to an embodiment.

FIG. 10 is a top-down view of a portion of the cable processing system 100 according to an embodiment. The retainer member 128 is in the extended position, and the exposed segments 136 of the conductors 106 of the cable 104 are secured by the arms 224 of the retainer member 128 in the designated presentation positions 108. In an embodiment, the positioning platform 130 and/or the retainer member 128 include indicator lines for axially aligning the cable 104 relative to the conductor positioning fixture 102. In the illustrated embodiment, the positioning platform 130 includes indicator lines 802 along the top surface 208, and the retainer member 128 includes indicator lines 804 along the top side 230, but in an alternative embodiment the fixture 102 may include only the indicator lines 802 or only the indicator lines 804. The end 402 of the jacket 114 is configured to be aligned with the indicator lines 802, 804 in order to accurately and repeatably measure the breakout length of the conductors 106. For example, both sets of the indicator lines 802, 804 define a window or zone 806. The cable 104 should be positioned such that the end 402 of the jacket 114 aligns between the indicator lines 802, 804, within the zone 806. In the illustrated embodiment, the end 402 is properly aligned within the zone 806. If the end 402 is not positioned within the zone 806, the operator can release the cable clamp 140 (shown in FIG. 1) and move the cable 104 into proper alignment before resetting the cable clamp 140 to secure the cable 104 to the fixture 102. Optionally, the indicator lines 802, 804 may be calibrated and used to provide specific breakout lengths by aligning the end 402 with a specific one of the indicator lines 802, 804.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely example embodiments. Many other embodiments and modifications within the spirit and scope of the claims will be apparent to those of ordinary skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A conductor positioning fixture comprising:
    a base including a positioning platform and a wedge that projects upward from a top surface of the positioning platform, the base configured to receive a cable on the top surface of the positioning platform such that exposed segments of a first conductor and a second conductor of the cable extend along opposite sides of the wedge; and
    a retainer member mounted to the base and movable relative to the base along a longitudinal axis between a retracted position and an extended position, the retainer member spaced apart from the wedge along the longitudinal axis when in the retracted position and at least partially overlapping the wedge along the longitudinal axis when in the extended position;
    wherein, as the retainer member moves from the retracted position towards the extended position, the retainer member is configured to engage and force the exposed segments of the first and second conductors of the cable into designated presentation positions.

2. The conductor positioning fixture of claim 1, wherein the retainer member extends along the longitudinal axis between a front end and an opposite rear end of the retainer member, the retainer member defining a channel at the front end, the wedge received in the channel when the retainer member is in the extended position.

3. The conductor positioning fixture of claim 1, wherein the retainer member includes two arms disposed above the top surface of the positioning platform such that a bottom side of each of the arms faces the top surface, wherein the bottom sides of the arms engage the exposed segments of the first and second conductors when the retainer member is in the extended position such that the exposed segments are secured in the presentation positions between the retainer member above the exposed segments and the positioning platform below the exposed segments.

4. The conductor positioning fixture of claim 3, wherein the two arms each extend to a respective distal end, each of the two arms including a tapered ramp surface along the bottom side at the distal end, the tapered ramp surface of each of the two arms configured to engage a corresponding one of the first and second conductors as the retainer member moves to the extended position to guide the first and second conductors to the presentation positions without stubbing.

5. The conductor positioning fixture of claim 3, wherein each of the two arms defines a nesting groove along the bottom side, the exposed segments of the first and second conductors of the cable received in the nesting grooves of the two arms when the retainer member is in the extended position to align the exposed segments in the presentation positions.

6. The conductor positioning fixture of claim 1, wherein the retainer member is configured to force the exposed segments of the first and second conductors of the cable into the presentation positions such that distal ends of the first and second conductors are cantilevered and project beyond respective front ends of the positioning platform and the retainer member.

7. The conductor positioning fixture of claim 1, wherein the positioning platform defines two nesting grooves in the top surface that are spaced apart from each other along the opposite sides of the wedge, the retainer member configured to force the exposed segments of the first and second conductors into the nesting grooves as the retainer member moves to the extended position to align the exposed segments in the presentation positions.

8. The conductor positioning fixture of claim 1, wherein the base includes one or more springs that bias the retainer member towards the extended position.

9. The conductor positioning fixture of claim 1, wherein the base includes a track adjacent to the positioning platform, the retainer member including a mounting portion that is mounted to the track, the retainer member further including a handle that extends from the mounting portion for manually moving the retainer member along the track between the retracted position and the extended position.

10. The conductor positioning fixture of claim 1, wherein the retainer member extends along the longitudinal axis between a front end and an opposite rear end thereof, the retainer member defining a channel extending from the front end to the rear end along the longitudinal axis, the channel open at a top side of the retainer member and configured to receive the cable loaded therein from above.

11. The conductor positioning fixture of claim 1, wherein the exposed segments of the first and second conductors protrude from an end of a jacket of the cable, wherein one or more of the top surface of the positioning platform or a top side of the retainer member include indicator lines for axially aligning the cable relative to the conductor positioning fixture such that the end of the jacket aligns with one or more of the indicator lines.

12. The conductor positioning fixture of claim 1, wherein the base includes a track adjacent to the positioning platform and located between the positioning platform and a securing platform, the securing platform mounted to a cable clamp that is configured to engage the cable to selectively fix an axial position of the cable relative to the securing platform.

13. A conductor positioning fixture comprising:
a base including a positioning platform and a wedge that projects upward from a top surface of the positioning platform, the base configured to receive a cable on the top surface of the positioning platform such that exposed segments of a first conductor and a second conductor of the cable extend along opposite sides of the wedge; and
a retainer member mounted to the base and movable relative to the base between a retracted position and an extended position, the retainer member including two arms spaced apart from each other and defining a channel therebetween, the two arms disposed above the top surface of the positioning platform such that a bottom side of each of the arms faces the top surface;
wherein, as the retainer member moves from the retracted position towards the extended position, the wedge is received within the channel between the arms and the arms engage the exposed segments of the first and second conductors to force the exposed segments into designated presentation positions.

14. The conductor positioning fixture of claim 13, wherein the retainer member moves linearly between the retracted position and the extended position along a longitudinal axis, the retainer member in the retracted position being spaced apart along the longitudinal axis from the wedge and the exposed segments of the first and second conductors.

15. The conductor positioning fixture of claim 13, wherein, when the retainer member is in the extended position, the bottom sides of the arms engage the exposed segments of the first and second conductors such that the exposed segments are secured in the presentation positions between the retainer member above the exposed segments and the positioning platform below the exposed segments.

16. The conductor positioning fixture of claim 13, wherein the two arms each extend to a respective distal end, each of the two arms including a tapered ramp surface along the bottom side at the distal end, the tapered ramp surface of each of the two arms configured to engage a corresponding one of the first and second conductors as the retainer member moves to the extended position to guide the first and second conductors to the presentation positions without stubbing.

17. The conductor positioning fixture of claim 13, wherein the positioning platform defines two nesting grooves in the top surface that are spaced apart from each other along the opposite sides of the wedge, the retainer member configured to force the exposed segments of the first and second conductors into the nesting grooves as the retainer member moves to the extended position to align the exposed segments in the presentation positions.

18. A conductor positioning fixture comprising:
a base including a securing platform, a positioning platform, and a track section located between the securing platform and the positioning platform, the base configured to receive a cable on the securing platform and the positioning platform such that exposed segments of a first conductor and a second conductor of the cable are disposed on the positioning platform, the securing platform having a cable clamp mounted thereto that is configured to engage a portion of the cable on the securing platform to fix the cable to the securing platform; and
a retainer member mounted to the track and movable relative to the base between a retracted position and an extended position, the retainer member configured to engage and force the exposed segments of the first and second conductors of the cable into designated presentation positions relative to the positioning platform as the retainer member moves from the retracted position towards the extended position.

19. The conductor positioning fixture of claim 18, wherein the base includes one or more springs along the track that bias the retainer member towards the extended position.

20. The conductor positioning fixture of claim 18, further comprising a first handle mounted to the retainer member and a second handle mounted to the securing platform, the first and second handles configured to be grasped for manual movement of the retainer member between the retracted position and the extended position.

21. The conductor positioning fixture of claim 18, wherein the positioning platform includes a wedge that projects upward from a top surface of the positioning platform, the exposed segments of the first and second conductors of the cable extending along opposite sides of the wedge, wherein the retainer member is spaced apart from the wedge along a longitudinal axis when in the retracted position and at least partially overlaps the wedge when in the extended position.

\* \* \* \* \*